June 5, 1928.
G. W. WARMOTH
1,672,105
MACHINE FOR CLEANING AND DISINFECTING SUBSTANCES
Filed Sept. 18, 1925
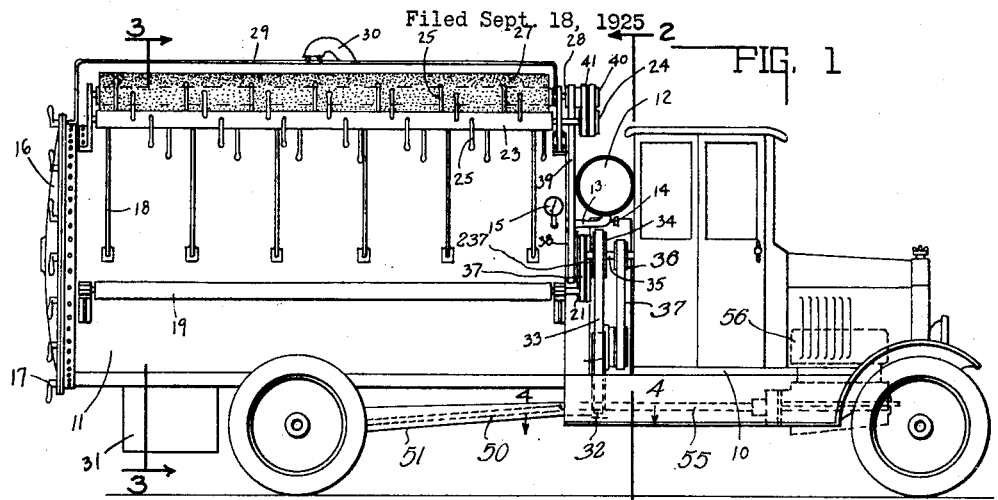
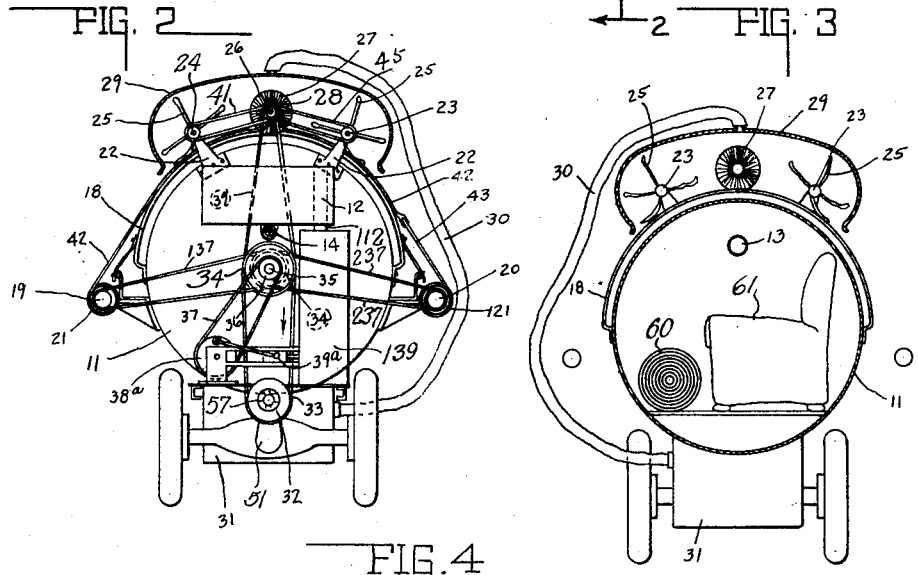
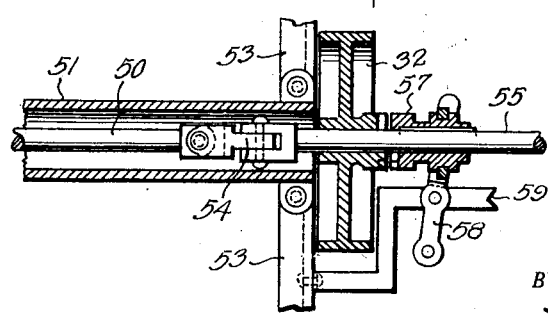
INVENTOR.
GEORGE W. WARMOTH.
BY
ATTORNEYS.

Patented June 5, 1928.

1,672,105

UNITED STATES PATENT OFFICE.

GEORGE W. WARMOTH, OF INDIANAPOLIS, INDIANA.

MACHINE FOR CLEANING AND DISINFECTING SUBSTANCES.

Application filed September 18, 1925. Serial No. 57,139.

This invention pertains to a portable cleaning device capable of cleansing and sterilizing rugs, carpets, blankets and the like.

The object of the invention is to provide a portable device mounted on a carrier such as a motor truck comprising a tank into which the material may be placed for sterilizing, and about the periphery of which there is provided a cleansing apparatus such as brushes and beaters, and an arrangement for conveniently handling the material on the tank while being operated upon, and the cleaning mechanism is operated by the motor which propels the vehicle.

Another feature of the invention resides in the curvature of the support whereby the nap of the rug will be separated and spread apart so as to facilitate the cleaning thereof.

The full nature of the invention will be understood from the accompanying drawings and the following description and claim.

Fig. 1 is a side elevation illustrating the device. Fig. 2 is a section taken on the line 2—2 of Fig. 1. Fig. 3 is a section taken on the line 3—3 of Fig. 1. Fig. 4 is a horizontal section of the means for propelling the automobile and driving the cleaning mechanism, on the line 4—4 of Fig. 1, parts being broken away.

In the drawings there is shown a truck chassis 10 having mounted thereon a cylindrical tank 11 of sufficient dimensions to receive therein carpets, rugs, blankets or the like, as well as upholstered furniture wherein it is desired to sterilize the fabric or other material by creating a vacuum or pressure in the tank as desired and forcing medicated air therein as may be proper for the treatment of the material. To this end there is provided a compressed air tank 12 mounted between the forward end of the tank 11 and the seat of the vehicle, said tank containing suitably treated air or other disinfecting fluid. The tank 12 is connected by the pipe 13 with the tank 11, said pipe being controlled by the valve 14 and the pressure in the tank 11 observed through the medium of the gage 15. At the rear of the tank there is a removable end plate 16 secured in place by the clamps 17, said end plate being entirely removable so the material can be placed bodily in the tank after which the plate is closed and secured in place ready for the treatment of the material.

Mounted upon the exterior of the tank which is circular in cross section, there are a plurality of supporting rods 18 having their ends rigidly secured to the tank on each side thereof and extending upwardly over the top of the tank in spaced relation thereto. Said rods are sufficiently close together to support the material such as a rug or carpet in spaced relation with the tank. Mounted on suitable brackets on each side of the tank there are rollers 19 and 20, said rollers being rotatably mounted in said brackets and provided at each end with the pulleys 21. The pulleys and the rollers are rotated by means of a series of pulleys and belts which will be hereinafter described. Near the top of the tank and on each side thereof there are brackets 22 upon which are mounted the shafts 23 having at their forward ends driving pulleys 24. Said shafts are provided with radially extending beaters 25 which are of a flexible nature so that as the shafts are rotated the beaters will be whipped against the surface of the material passed over the tank and supported upon the rods 18.

Intermediate the beaters there is a shaft 26 which extends longitudinally of the tank above its uppermost surface that carries a rotary brush 27 in such position as to engage and sweep or brush the material as it passes thereunder. Said brush is driven through the medium of the pulley 28 which is mounted on the inner end of the shaft 26. The beaters and brush are enclosed by a cover or hood 29 so that the dust driven from the material thereby will be caught in said hood and drawn through the hose 30 to a suitable container 31 by means of a partial vacuum created in the usual manner through the driving of the vehicle motor.

The mechanism is driven from the vehicle motor 56 to the drive shaft 55, which shaft is coupled with the shaft 50 by the universal coupling 54, the shaft 50 being located in a casing 51 mounted on the cross bar 53 of the chassis. A pulley 32 is loosely mounted on the shaft 55 and clutched therewith by a clutch 57 operated by a clutch lever 58 pivoted on the part 59 of the frame connected with the cross bar 53, as appears in Fig. 4. A belt 33 extends from the pulley 32 up to a pulley 34 mounted on a shaft 35 between the tank 11 and the rear end of the seat, as seen in Fig. 1. On the shaft 35 there is secured a pulley 36 which drives a belt 37 for operating the eccentric 38ª which drives the air pump 39ª for compressing air or creating partial vacuum in an air tank 139 that is connected with the tank 12 through pipe 112 which in turn is connected with the main tank 11 by the pipe 13. There is also keyed on the shaft 35 two pulleys, not clearly shown, which drive two laterally extending belts 137 and 237 operating respectively over pulleys 21 and 121 on the ends of roller shafts 19 and 20. There is also keyed on the shaft 35 a pulley 38 which drives the belt 39 on a pulley 28 secured on the shaft 26 of the brush 27. On the shaft 26 of the brush 27 there are secured pulleys 40 which drive belts 41 that drive pulleys 24 on the ends of the beater shafts 23.

In using the device it is driven to the residence where the rugs, carpets or the like are to be cleaned and the motor of the motor truck drives the cleaning mechanism which has been described. This enables the cleaning apparatus to be taken from residence to residence where the cleaning is done instead of the rugs, carpets or the like being taken to some distant cleaning establishment, and, if desired, the cleaning operation may be carried on and the truck propelled at the same time.

In cleansing and treating the material if it is in the form of a carpet, rug, blanket or the like, it is first rolled upon the roller 20 and the straps 42 are attached to the edge thereof and passed over the top of the tank 11 and secured to the roller 19. The rollers are then operated to cause the straps 42 to pull the material 43 up to the point where it first passes under one of the beaters 25. The beater is then rotated so that the material is engaged thereby as it slowly passes thereunder and under the brush 27 which brushes away the dust beaten therefrom. The material continues to be moved under the second beater and thence about the roller 19. After it is caused to slowly pass under the beaters and brush, the dust contained therein is removed after which the material is rolled upon the roller 20. The parts may be operated in the direction of the arrow shown in Fig. 2, opposite the belt 33, although the apparatus may be reversely operated and the carpets reversely passed through the machine.

Such flat material, after having been cleansed by beating and brushing in this manner, as well as bulky material such as upholstered or overstuffed furniture, may be placed in the tank in which it may be treated in various ways. In Fig. 3 there is shown a carpet roll 60 and an upholstered chair 61. One desirable manner of treating the material comprises in first producing a partial vacuum in the tank so that the air contained in the material is drawn therefrom. After the partial vacuum has been created in the tank, suitable medicated air is introduced therein and raised to such pressure as to penetrate the material, taking the place of the air which it had contained. This causes the medicated air to penetrate to the innermost cells of the fabric so as to affect any life which may be contained therein.

The invention claimed is:

Mechanism for cleaning carpets and like material including a cylindrical tank, a series of rods extending circumferentially over the upper half of the tank for supporting the material and spacing it away from the surface of the tank, a roller on each side of the tank for winding and feeding the material over the supporting rods on the tank, a rotary brush mounted over the tank and rods in position to engage and clean the material, a beater beside the brush, and a common means for driving said rollers, brush and beater, substantially as set forth.

In witness whereof, I have hereunto affixed my signature.

GEORGE W. WARMOTH.